United States Patent [19]
Burns et al.

[11] Patent Number: 5,315,111
[45] Date of Patent: May 24, 1994

[54] METHOD AND APPARATUS FOR LASER BEAM DRIFT COMPENSATION

[75] Inventors: Leslie L. Burns, Saratoga; William Barrett, San Jose; Robert Tsai, Los Altos, all of Calif.

[73] Assignee: Lasa Industries, Inc., San Jose

[21] Appl. No.: 961,514

[22] Filed: Oct. 15, 1992

[51] Int. Cl.$^5$ ............................................. H01J 3/14
[52] U.S. Cl. ................................. 250/235; 219/121.8
[58] Field of Search .............. 250/234, 235, 236, 561; 219/121.78, 121.79, 121.8, 121.81

[56] References Cited

U.S. PATENT DOCUMENTS

| | | |
|---|---|---|
| 3,632,205 | 1/1972 | Marcy . |
| 3,762,821 | 10/1973 | Bruning et al. . |
| 3,902,036 | 8/1975 | Zaleckas . |
| 4,040,748 | 8/1977 | Belleson et al. . |
| 4,279,472 | 7/1981 | Street . |
| 4,447,723 | 5/1984 | Neumann . |
| 4,600,837 | 7/1986 | DiStefano et al. ................ 250/235 |
| 4,661,699 | 4/1987 | Welmers et al. .................. 250/235 |
| 4,713,537 | 12/1987 | Kunz et al. . |
| 5,012,089 | 4/1991 | Kurusu et al. .................... 250/235 |
| 5,185,676 | 2/1993 | Nishiberi .......................... 250/236 |

Primary Examiner—David C. Nelms
Attorney, Agent, or Firm—Cushman, Darby & Cushman

[57] ABSTRACT

A method and apparatus for laser beam drift compensation. A portion of the laser beam is split off and focused onto a photocell through a reticle. As the laser beam scans the reticle, the actual position of the laser beam is determined and compared with its anticipated position. Compensation is made for any deviation in the beam position in a closed-looped manner to provide accurate optical alignment of the laser beam to the workpiece.

25 Claims, 6 Drawing Sheets

METHOD AND APPARATUS FOR LASER BEAM DRIFT COMPENSATION

BACKGROUND OF THE INVENTION

This invention relates to laser beam processing of materials, and more particularly, to a method and apparatus for laser beam drift compensation in a materials processing machine.

Manufacturing and materials processing machines that employ lasers for their source of processing energy are subject to variations in the laser because of temperature, vibration, power-up and shutdown of the laser source, and random drifting of the laser pointing direction. Over relatively short periods of time, the precise direction of laser beam wanders slightly. This laser beam characteristic appears to be random and cannot be predicted.

Many laser processing machines use acousto-optic deflectors to deflect or scan the laser beam. Acousto-optic deflectors are sensitive to their immediate past use. It appears that heating of the piezoelectric deflector crystals that make up the heart of the acousto-optic scanner depends on the deflection required from each of the x or y deflectors. That is, if deflection is required at the upper-right of the field of scan, the x and the y deflector crystals will heat up a certain amount. If deflection is required in another part of the scan field, the crystals will heat up to a different degree. As a pattern is written by scanning the laser beam, the crystals heat up in varying amounts according to the particular pattern. The variations in heating cause beam shape distortion, pin cushion distortion, and pointing direction errors depending on the difference in the temperature of the crystals at the time of the last alignment of the laser beam and the temperature at the time of writing. These deflection distortions are dependent on the pattern written.

The deflection distortions discussed above are unimportant in many laser processing applications, but can easily amount to several micrometers of error on the working surface of the workpiece to be processed by the laser. Employing a laser processing machine to write patterns on an integrated circuit surface, which is used to make gate arrays, may cause deflection distortions that are intolerable.

It is possible, but very expensive, to design the mountings of passive optical components to eliminate virtually all effects of temperature variations. The expense and difficulty of insuring temperature independence of the optical components is cost prohibitive in all but the most exacting laser processing machines.

Accordingly, there is a need for an inexpensive method and apparatus to compensate laser beam drift.

SHORT STATEMENT OF THE INVENTION

The invention provides a method and apparatus that compensates for deflection distortions in a laser processing system based on temperature, vibration, power-ups and power-downs, and random drifting of the laser pointing direction. In the present invention, a portion of the laser beam is split from the main laser beam after the laser beam has passed through most of the components, but most particularly, after the beam has passed through the x-y acousto-optic deflectors. The portion of the beam that has been split off from the main beam is focused onto a reticle that, in one embodiment, has a glass plate with a cross inscribed in the central region of the plate. Behind the reticle is a photocell that collects the laser light after the beam has passed the reticle. As the beam scans over the scan field, it crosses a line on the reticle, and the light that reaches the photocell is reduced. The position of the laser beam at the time of crossing is determined accurately and compared to the anticipated position of the laser beam. Any differences in the anticipated position of the beam and its measured position is compensated by control electronics of the x-y acousto-optic deflectors. Thus, compensation is provided for any variations in the laser beam position due to temperature, vibration, power-ups or power-downs or laser beam pointing direction instabilities.

Various types of reticles may be used to block the light reaching the photo detector. Alternatively, the reticle and photocell combination may be replaced by a four-quadrant photocell that provides information when the light crosses from one quadrant to an adjacent quadrant.

BRIEF DESCRIPTION OF THE DRAWINGS

Other improvements, advantages and features of the present invention will become apparent from the following claims and the accompanying drawings in which:

DETAILED DESCRIPTION OF THE PREFERRED EMBODIMENTS

Figure 1:
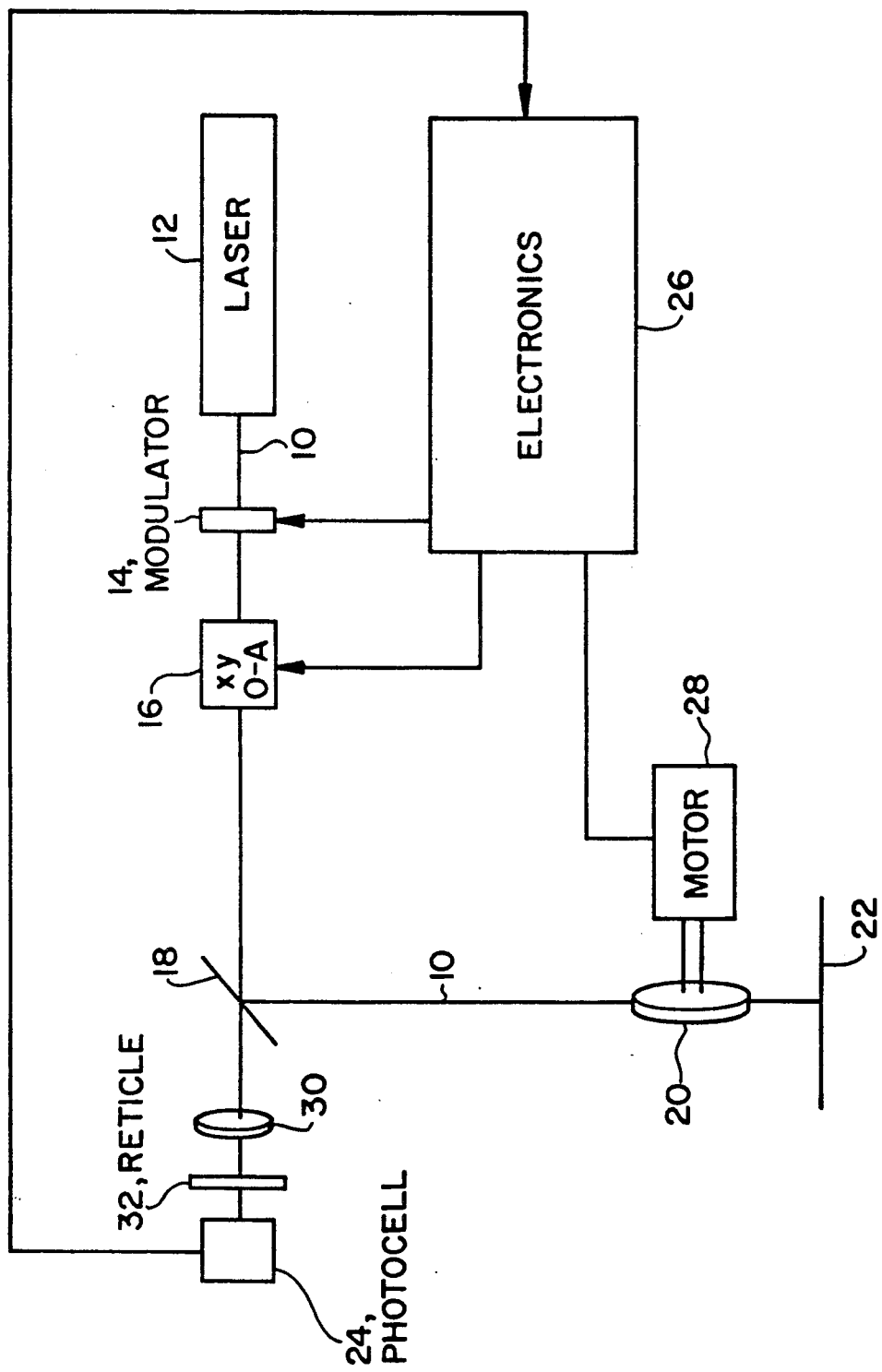
FIG. 1 is a schematic representation of one form of a laser beam drift compensation system according to a preferred embodiment of the present invention.

FIG. 1 illustrates a laser processing system that incorporates the features according to a preferred embodiment of the present invention. A laser beam 10 is directed from a laser source 12 through a modulator 14 and x-y acousto-optic deflector 16. The laser beam exits x-y deflector 16 and is directed by a partially transparent mirror 18 to an objective focusing lens 20 onto workpiece 22. A small percentage of the laser beam passes through the partially transparent mirror 18 and is directed by a focusing lens 30 through a reticle 32 onto a photocell 24.

The output from the photocell 24 can be used to control the power level of the laser system as known in the art. Similar controls are described in U.S. Pat. Nos. 4,243,848, 4,804,831 or 4,725,722, the disclosures of which are incorporated by reference. Typically, the laser beam detected by the photocell 24 is a function of the laser beam energy and can be monitored by electronic control unit 26 to control accurately the laser beam energy through attenuating modulator 14.

Laser beam focus on the workpiece is controlled by the objective lens 20, which is positioned by motor 28, in a manner well-known in the art. The positioning motor 28 is driven by signals from the electronic control unit 26. Unit 26 uses a processor for timing, calculating and storing data.

Figure 2:
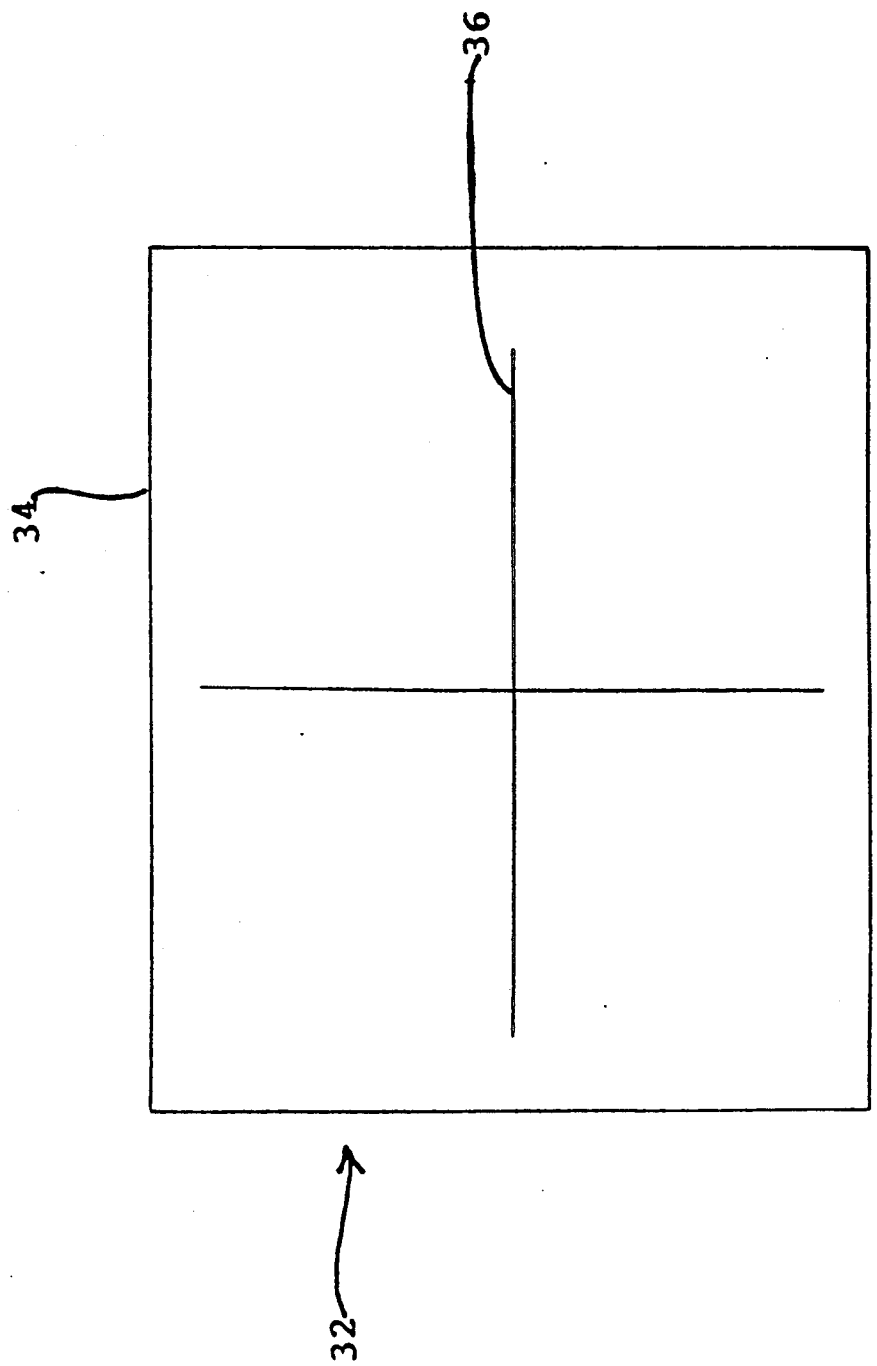
FIG. 2 is a detailed drawing of a reticle used in the present invention.

The reticle 32 of FIG. 1 is shown in detail in FIG. 2. The reticle has a glass substrate 34 that contains a centrally disposed engraved opaque cross 36. As a laser beam is driven by x-y deflector 16, the beam crosses over a line on the reticle 32 and the light that reaches the photocell 24 is disrupted. The light disruption occurs at a known position based on the relation of the reticle to the workpiece.

In a first method for using a photocell signal, a check can be made on both the pointing of the laser and the accuracy of the acousto-optic deflectors prior to writing each segment or tile on a workpiece. An integrated circuit on which writing is to occur may be divided into many segments that are connected together. Each segment represents the limitation of the field range of the acousto-optic deflectors. In the first method, prior to writing a new segment or tile for the integrated circuit, the deflector causes the beam to deflect in the x direction. As a beam crosses the vertical line on the reticle, the photocell generates a blip output that corresponds to the mechanical position of the reticle. Since the computer has the anticipated position of the vertical lines stored in its memory, it will expect the blip to occur at a certain reference position. If the blip occurs where the computer expects it, the system is in alignment. If, on the other hand, the blip occurs in a position before or after the position where the computer expects it, the computer computes the error and adds or subtracts an increment to the stored position so that the commanded position for writing with the laser beam will be the actual desired position. Similarly, the same takes place for the vertical or y deflection of the laser beam where the current blip is compared to a known reference; therefore, compensation is made so that the commanded position of the x-y acousto-optic deflector becomes the actual desired position.

The same reticle as shown in FIG. 2 may be used with a second method for checking alignment. In this second method, the computer does not take the time to check the alignment as described above, but rather expects the blip to occur at the location stored in its memory while writing the tile or segment in the normal course of operation. If the blip occurs in a position different from where it is expected, the computer computes the error and makes an incremental adjustment to its position table that is stored in its memory. Since this check or adjustment is made for every field, and the segments are written rapidly, short term drifts are corrected in an almost continuous manner.

Figure 3:
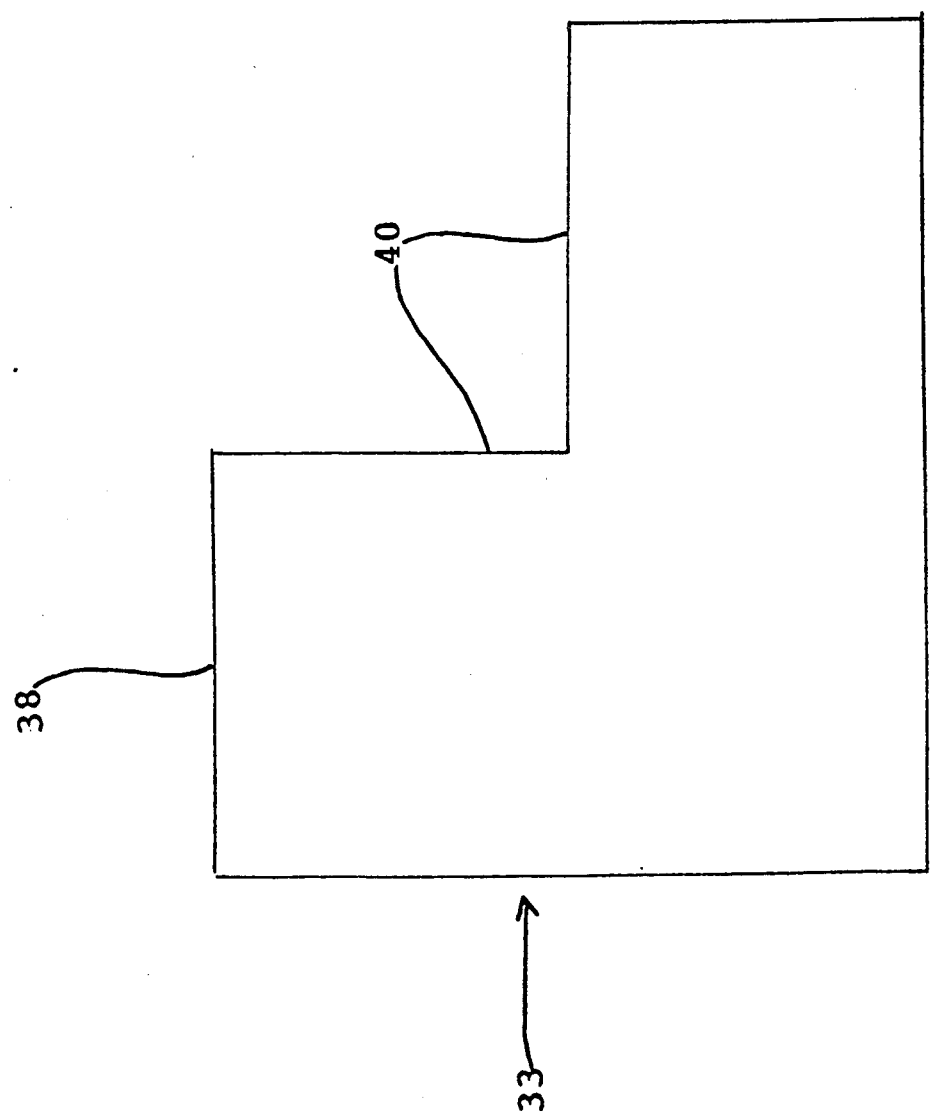
FIG. 3 is a detailed drawing of an alternative embodiment of a reticle employed in the present invention.

A second embodiment of the present invention employs the reticle 33 shown in FIG. 3. In reticle 33, the cross hairs are replaced by two knife edges 40 that are ground onto a piece of metal 38. These knife edges serve the same purpose as the cross hairs on the glass reticle in the earlier discussed embodiment. The methods for checking alignment for the laser beam prior to writing the pattern, or during writing, remain the same.

Figure 4:
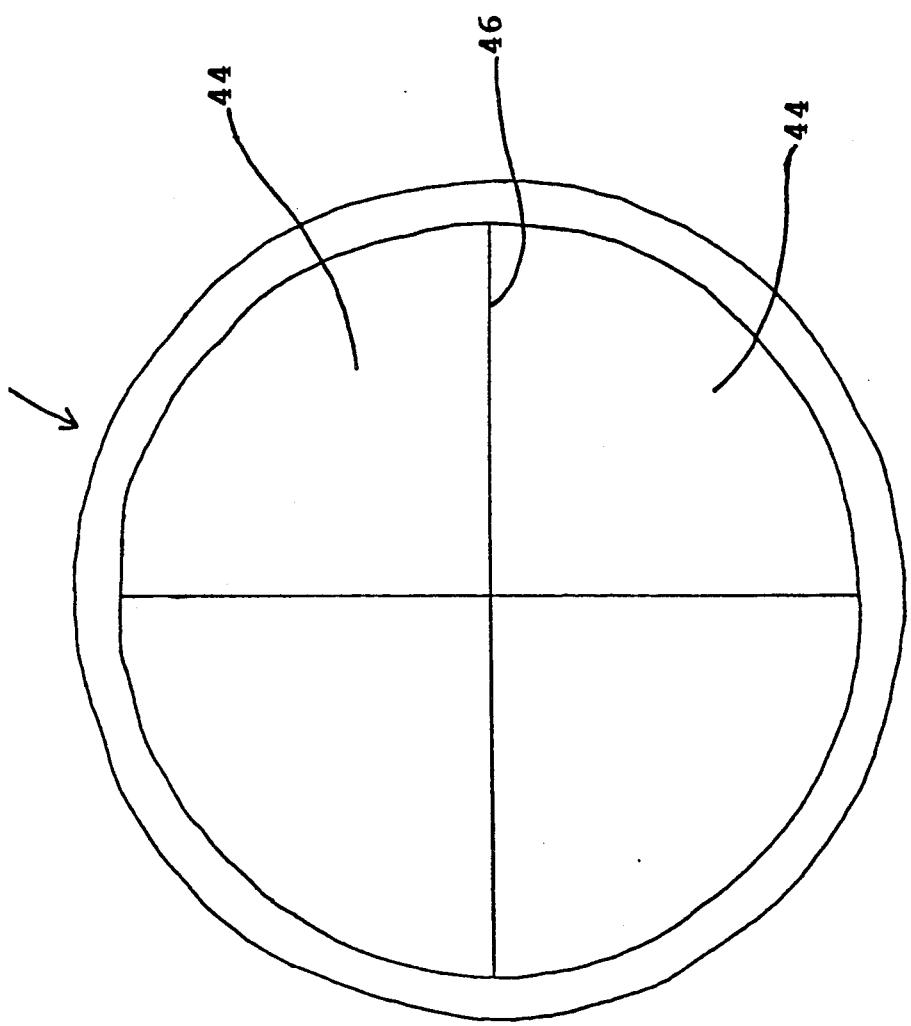
FIG. 4 is a schematic representation of a four-quadrant photocell used in place of the reticle and photocell as shown in FIG. 1.

An alternative embodiment of the present invention may be made by replacing the reticle 32 and the large area photocell 24 by a four-quadrant photocell detector. A four-quadrant photocell 42 is shown in FIG. 4. The boundaries 46 that are located between the four-quadrants 44 need to be sharply defined. The focusing lens 30, as shown in FIG. 1, focuses the laser beam pattern onto the four-quadrant photocell. As the beam crosses a boundary between quadrants, information that determines the beam position is derived. The outputs of the four quadrants are summed and fed to an A/D converter and then to the control electronics unit 26. Alternatively, the outputs from each quadrant can be fed separately to an A/D converter and then to the computer of the control electronics unit 26. In this case, the computer interprets the change of one quadrant outputs going to zero and another quadrant output rising as an indication that a boundary has been crossed. In either case, the interpretation of the boundary crossings is used to determine the laser beam position and adjust the beam alignment similar to the earlier-described methods.

Figure 5:
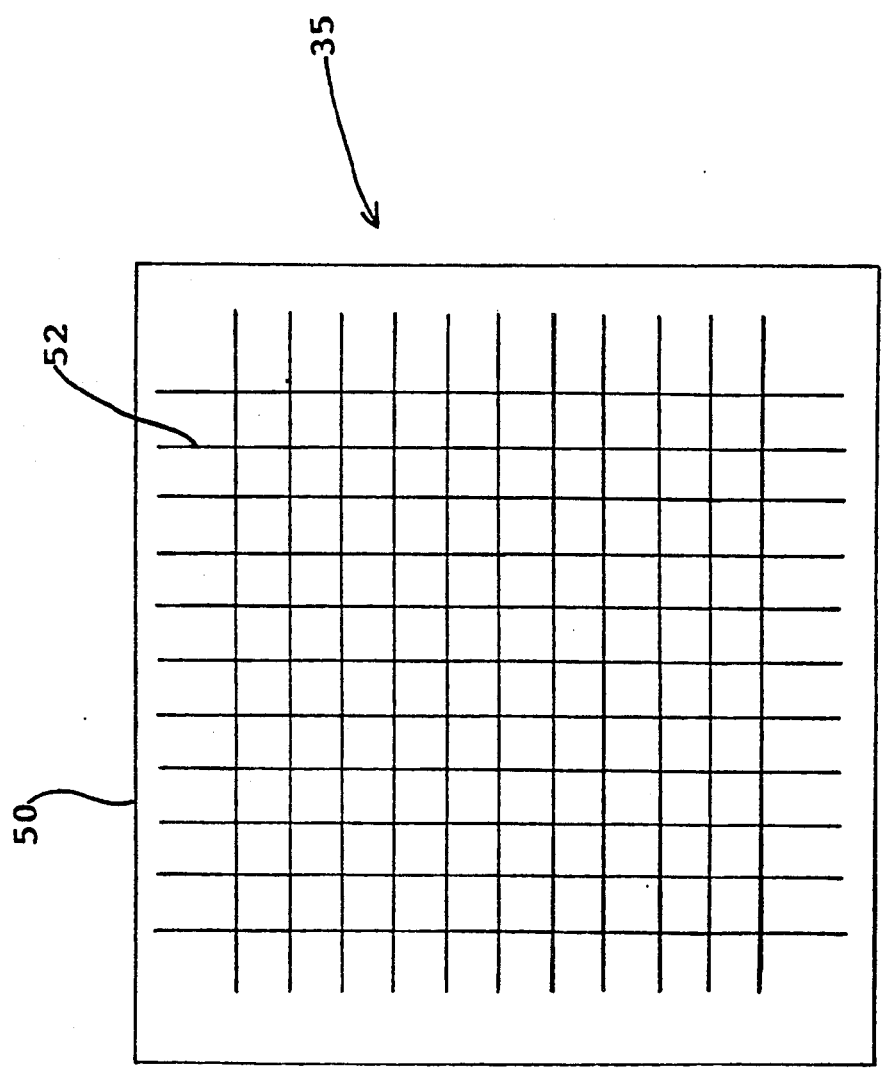
FIG. 5 is a detailed drawing of a reticle having a grid array design used as an alternative in the present invention.

The reticle can be in the form of a grid array in yet another embodiment of the present invention. This embodiment is shown in FIG. 5 wherein the reticle 35 comprises a glass substrate 50 containing lines 52 that have been etched or described on the surface of the substrate. Lines 52 form a grid array pattern on the glass substrate. It is apparent that the same information may be obtained from this pattern as from the cross hair patterns previously described. However, this pattern also provides information to allow for correction of optical distortion in the deflection pattern. For example, in the case of pincushion distortion, a line on a grid would appear at the correct positions near the center of the field; but as the outer corners of the field are approached, the blips caused by the focused laser beam that crosses the grid would occur at incorrect positions compared to the pattern stored in the computer memory. The computer takes note of the incremental errors as they occur and computes correction factors to add to the pattern stored in the computer memory. Variations in optical magnification over the field can be compensated by use of the grid array reticle. As above, the system can be used to make adjustments before or during the writing of a segment.

Yet another embodiment of the present invention also employs the reticle 33 shown in FIG. 5. Three non-collinear crosspoints are chosen, preferably widely spaced, for example, one each near the upper-left, upper-right and lower-left corners of the reticle. The exact positions of these crosspoints is immaterial.

The laser beam is moved across a horizontal and a vertical edge near each crosspoint, resulting in a precise determination of the laser beam coordinates corresponding to the edge. In order to remove a biasing effect resulting from variations in light energy and the finite size of the focussed laser beam spot, it is best to scan the two opposite edges of a reticle line, for example, the left edge and the right edge of a vertical line, then use the average of the two positions thus obtained.

These edge scans yield six measurements in all, three in the x direction (across vertical edges) and three in the y direction (across horizontal edges). They comprise a triplet of points Pn. A drift in the deflection system, or laser beam angle, or mirror angle over time can now be measured through a sequence of point triplets P0, P1, P2, etc. taken at various times. A corresponding set of transforms T0, T1, T2, etc. can be defined such that $Pi = Ti * P0$. That is, transform T2 applied to the point set P0 will yield point set P2. Transform T2 will also map any point in the two-dimensional space of the laser beam deflection space into a corrected point, to the extent that the deflection system is linear.

Typically, transform Tn takes the form of a 3×3 matrix $$\begin{vmatrix} a & b & c \\ d & e & f \\ 0 & 0 & 1 \end{vmatrix}$$

The six coefficients of Tn are easily computed from the point sets Pn and P0. Tn will usually be very nearly a unity matrix, i.e. coefficients a and e will be nearly 1 and the remaining coefficients will be nearly 0.

Most of the observed drift with an AO deflector is in the translational terms c and f. The remaining terms (a,b,c,d) measure smaller—but significant—effects of field rotation and scale warp.

The point set P0 should be taken at a moment in time in which the laser beam positions are being calibrated. The calibration processes are known in the art. They yield a calibration transform Tc that can map a desired physical position for the beam into a pair of deflection coordinates. Additional points may be selected within the field for edge scans as a means of redundancy and increasing the precision of the device. The coefficients a ... f are then overdetermined, requiring a regression analysis to determine the bestfit values to the experimental numbers.

The transform Tn has two applications in general—a) positioning the laser beam to a predetermined physical position within its field, and b) measuring the physical position of the beam given a pair of deflection coordinates.

In the former case (a), a physical position P is desired at some moment in time. The required deflection coordinates Pd can then be computed by obtaining the transform Tn through an edge measurement as described above, then applying the following formula:

$$Pd = Tn * Tc * P$$

In the latter case (b), the laser beam has been used to identify a particular physical position by some unspecified means; we desire the best estimate of the physical coordinates of that position given the deflection coordinates of the position. Let Pd be the deflection coordinates of the point; then the physical coordinates Q are given by $$Q = \sim Tc * \sim Tn * Pd$$

where $\sim Tx$ is the inverse of matrix Tx.

In this embodiment, a single determination of Tn may be followed by a sequence of laser beam movements, for example for the purpose of inscribing a pattern on a light-sensitive surface, provided that the time required to make the Tn determination and the sequence of laser beam movements is small compared to the minimum time in which an unacceptable drift might take place.

An estimate of the effectiveness of this embodiment may be determined as follows.

The thermal time constant of an acousto-optic modulator of the type commonly used is about 10 seconds. One measurement of Tn requires a fraction of a second. Writing a file full of features requires one to two seconds. If all the tile features are toward one corner of the tile, there will be a progressive drift in the deflector mapping function toward that corner because of, due to the deflector's pattern-sensitive thermal effects. This source of drift is typically about 1 micron over a large time scale; in one second it will therefore be 0.1 micron or less. A tile with all features toward one corner would be unusual. Nearly all tiles have features scattered around the tile field, and this results in a less pronounced pattern-sensitive thermal drift. Should a tile require more than one second to write all features, we recommend that the writing be interrupted with additional measurements of Tn and the consequent computation of transformed points.

Other thermal and drift factors have much longer time scales, typically measured in minutes or hours; the present invention provides an excellent compensation for these.

Short term variations are not so compensated. For example, vibration will not be compensated in this embodiment of the invention, but might in one of the alternate embodiments.

It can be seen that this invention provides a method of closed-loop optical alignment of a laser beam system. Corrections can be made periodically and frequently to eliminate drifts that occur over periods of tens of seconds or longer. Since most observed instabilities are slow compared to the time between writing of segments, this invention makes the system much more reliable and greatly extends the time between manual optical alignments.

The intensity of the signal from the photocell is a measure of the laser beam energy and therefore can be used for automatically adjusting the laser beam energy to that desired for proper writing of a segment.

Figure 6:
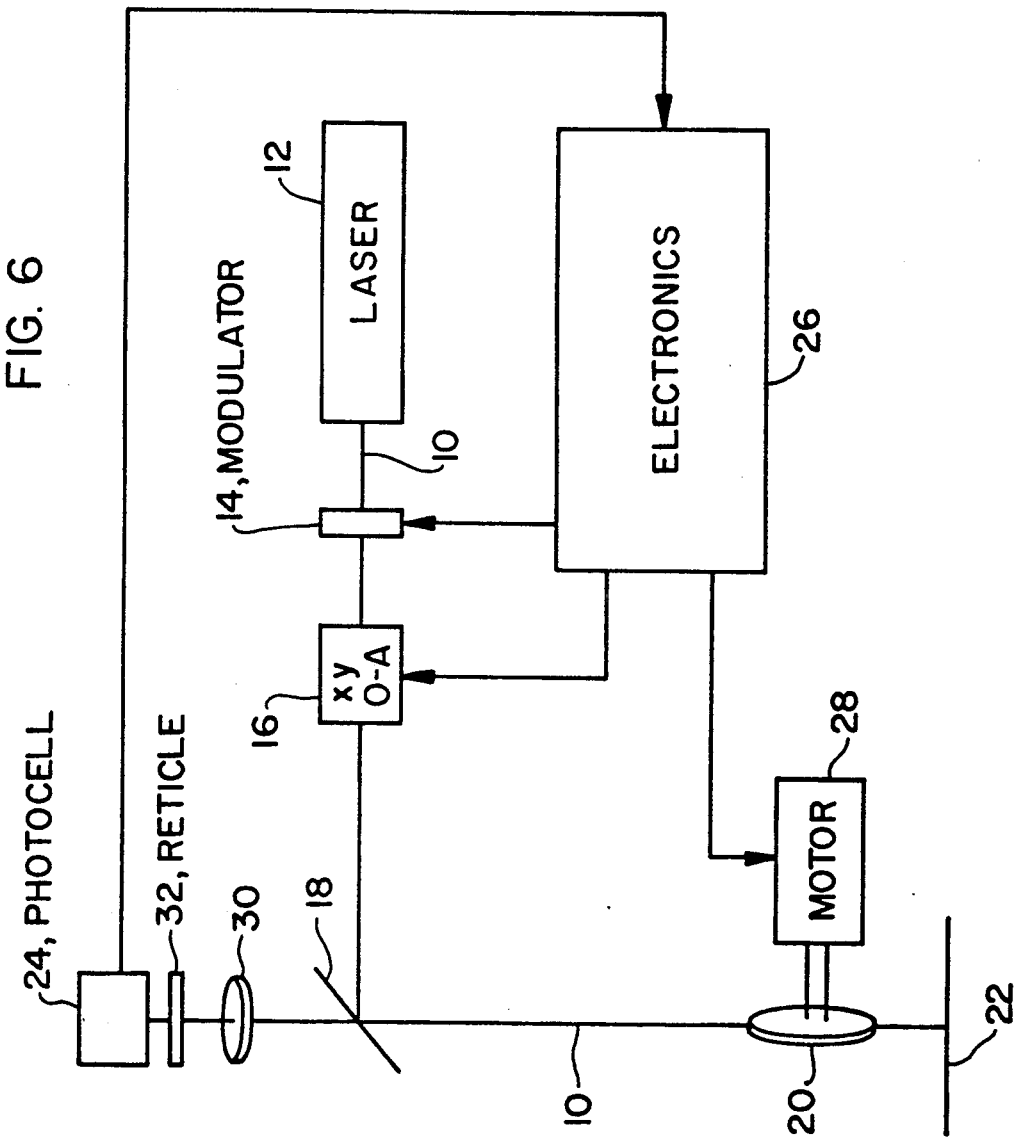
FIG. 6 is a schematic representation of an alternative embodiment of the present laser beam drift compensation system using reflected laser light from the workpiece.

In an alternative configuration of the overall laser processing system of the present invention, the laser beam can be intercepted on its return path from the working surface. This arrangement is shown in FIG. 6 in that it can be seen that the light reflected from the workpiece 22 is transmitted through partially transparent mirror 18 and focused by lens 30 through the reticle 32 onto the photocell 24. The advantage of this version is that corrections for slight thermal drifts of the lens mounting system and the final mirror position can be corrected.

While the invention has been described in connection with what is presently considered to be the most practical and preferred embodiments, it should be anticipated that other more varied embodiments may be utilized in keeping with the spirit and scope of the present invention as defined by the appended claims.

What is claimed is:

1. A method of compensating for laser beam drift comprising the steps of:
    deflecting a laser beam to desired coordinates on a workpiece;
    directing at least a portion of the laser beam to a structure having a known optical configuration;
    detecting an altered laser beam which has passed through said structure and generating a position signal corresponding to an altered portion of the laser beam;
    detecting, from said position signal, a position where the altered portion of the laser beam intersects said optical configuration;
    comparing the position of the laser beam determined in the detecting step, to an anticipated position of the laser beam at a time when said detecting step occurs; and
    compensating for deviation between the anticipated beam position and the determined beam position.

2. The method of claim 1 wherein said coordinates are random x and y coordinates.

3. The method of claim 1 wherein the known optical configuration is a cross-shaped reticle.

4. The method as in claim 1 wherein said directing step directs a portion of the laser beam prior to the laser beam reaching the workpiece.

5. A method according to claim 1 wherein said directing step directs a portion of the laser beam which has been reflected from the workpiece.

6. An automatic laser beam drift compensation system comprising:
   a laser which generates a laser beam;
   means for deflecting the laser beam in desired directions onto a workpiece;
   a reticle having an area with a known optical configuration thereon, which area affects a laser beam passing therethrough;
   a detector, located to convert laser beam light which has passed through said reticle to a signal corresponding to an amount of light received thereby;
   detecting means for detecting changes in the signal from the detector as the portion of the light beam directed toward the reticle crosses said area on the reticle and is changed, the changes taking place at a known position relative to the workpiece;
   comparison means for comparing an actual laser beam position with an anticipated laser beam position; and
   means for compensating, in response to said comparison, for any deviation in laser beam position.

7. The automatic laser beam drift compensation system of claim 6 wherein the reticle comprises a glass substrate having a cross-hair inscribed on a central portion of the substrate.

8. The automatic laser beam drift compensation system of claim 6 wherein the reticle comprises a glass substrate having a grid array pattern inscribed on a substantial portion of one surface of the substrate.

9. An automatic laser beam drift compensation system comprising:
   a laser beam generator for generating a laser beam;
   means for deflecting the laser beam in a controlled 2-dimensional direction onto a workpiece;
   means for converting laser beam light to an electrical signal, the electrical signal corresponding to the amount of light received by the converting means;
   means for conveying at least a portion of the laser beam light through a reticle onto the converting means, said reticle having opaque indicia to block the laser light;
   detecting means for detecting interruptions in the electrical signal from the converting means as the portion of the light beam directed toward the reticle crosses indicia on the reticle and is blocked, the blockage taking place at a known position relative to the workpiece;
   comparison means for comparing detected laser beam position with an anticipated laser beam position; and
   means for compensating in response to said comparison means for any deviation in laser beam position.
   wherein the reticle comprises a metal plate having machined knife blades, the knife blades being perpendicular to each other.

10. The automatic laser beam drift compensation system of claim 6 wherein the deflecting means is an acousto-optic deflector which randomly deflects the laser beam in x and y directions.

11. The automatic laser beam drift compensation system of claim 6, wherein the detector is a photocell.

12. The automatic laser beam drift compensation system of claim 6 further comprising a partly transparent mirror which conveys a portion of the laser light to the reticle.

13. The automatic laser beam drift compensation system of claim 6 wherein the detecting means, comparison means and compensating means is formed by an electronic control unit including a digital computer.

14. The automatic laser beam drift compensation system of claim 6 wherein the detector means is a four-quadrant photocell which detects the laser beam crossing from one quadrant to another.

15. The automatic laser beam drift compensation system of claim 14 wherein the electrical signal from the four quadrants of the photocell are summed and fed to an analog-to-digital converter and then to a digital computer.

16. The automatic laser beam drift compensation system of claim 14 wherein the four quadrants of the photocell are individually fed to an analog-to-digital converter and then to a digital computer.

17. A system according to claim 12 wherein said partially transparent mirror is located in a location where laser light is sent to said reticle upstream, with respect to a direction of the laser light, of said workpiece.

18. A system as in claim 6 wherein said laser light is sent to said reticle after reflection from said workpiece.

19. A system as in claim 7 wherein said deflecting means comprises means for scanning a horizontal edge and a vertical edge near a cross-point of the cross-hair.

20. A system as in claim 19 wherein said deflecting means includes means for scanning two opposite edges of a reticle line and for detecting said changes of each of said opposite edges.

21. A system as in claim 20 wherein said comparison means includes means for averaging results from said two opposite edges and using said average as a detected laser beam position.

22. A method as in claim 3 wherein said directing step scans a horizontal edge and a vertical edge near a cross-point of the cross-shaped reticle.

23. A method as in claim 3 wherein said directing step scans two opposite edges of a reticle line and detecting said changes of each of said opposite edges.

24. A method as in claim 20 wherein said detecting step includes averaging said two scans and using said average as a detected laser beam position.

25. An automatic laser beam drift compensation system comprising:
   a laser which generates a laser beam;
   a reticle having an area with a known optical configuration including multiple cross-points thereon, which area affects a laser beam passing therethrough;
   means for deflecting the laser beam in desired directions onto a workpiece including at least three of said cross-points;
   a detector, located to convert laser beam light which has passed through said reticle to a signal corresponding to an amount of light received thereby;
   detecting means for detecting changes in the signal from the detector as the portion of the light beam directed toward the reticle crosses said area on the reticle and is changed, the changes taking place at a known position relative to the workpiece;

means for compensating drift using said at least three cross-points;

comparison means for comparing a detected laser beam position where the signal is changed with an anticipated laser beam position at that time; and means for compensating, in response to said comparison for any deviation in laser beam position.

* * * * *